United States Patent

[11] 3,577,082

[72] Inventors Alex Honore Lautier
Vence;
Henri Jean Nussbaumer, La Gaude; Jean Marc Pierret, Falicon Nice, France
[21] Appl. No. 804,570
[22] Filed Mar. 5, 1969
[45] Patented May 4, 1971
[73] Assignee International Business Machines Corporation
Armonk, N.Y.

[54] CARRIER FREQUENCY PHASE-READJUSTMENT DEVICE
6 Claims, 6 Drawing Figs.

[52] U.S. Cl. .......... 325/416, 325/330, 325/419, 333/15
[51] Int. Cl. .......... H04b 1/16
[50] Field of Search .......... 325/49, 329, 42, 44, 369, 323—325, 476; 333/15—18; 325/50, 65, 330, 416, 419, 421

[56] References Cited

UNITED STATES PATENTS

| | | | |
|---|---|---|---|
| 3,283,063 | 11/1966 | Kawashima et al. .......... | 325/65 |
| 3,450,842 | 6/1969 | Lipke .......... | 179/15P |

*Primary Examiner*—Robert L. Richardson
*Assistant Examiner*—Albert J. Mayer
*Attorneys*—Hanifin & Jancin and Delbert C. Thomas

ABSTRACT: A phase synchronizing device for the carrier of a single sideband transmission system. Two pilot frequencies are transmitted with the synchronization signal and are decoded at the receiver to provide a signal indicating the correct phase of the demodulating carrier signal. The transmitted carrier signal controls the frequency of an oscillator and the initial phase of the regenerated carrier signal is set a the start of reception by the decoded pilot signals.

CARRIER FREQUENCY PHASE-READJUSTMENT DEVICE

OBJECT OF THE INVENTION

This invention relates to a method and a structure for readjusting for the phase shift of the carrier frequency of a single sideband transmission system, a phase shift which, in general, appears at the reception side as a phase difference between the carrier signal and the data signal and which is due to the fact that the carrier frequency normally transmitted is in the vicinity of the edge of transmitted signal spectrum and within the nonlinear part of the transmission channel.

It is an object of this invention to provide both a structure and a method for reconstituting the carrier frequency with both the required frequency and the correct phase.

The invention is more particularly characterized in that, at the receiver, the carrier frequency is regenerated (with its possible frequency shift) and is then changed to a correct phase, (i.e. to the phase that it would have after transmission through an equivalent linear circuit). The phase change is determined from two frequencies appropriately positioned within the signal spectrum and in the linear phase variation zone of the transmission channel.

The foregoing and other objects, features and advantages will be apparent from the following more particular description of preferred embodiments of the invention, as illustrated in the accompanying drawings.

DRAWINGS

DESCRIPTION OF THE INVENTION

Figure 1:
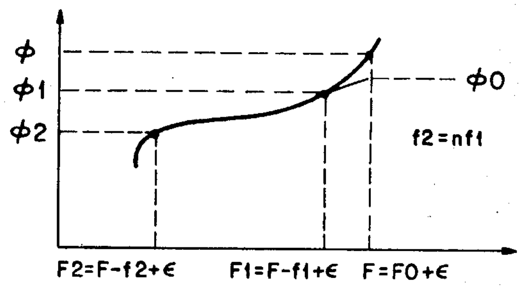
FIG. 1 is a phase-frequency diagram.
Figure 2:
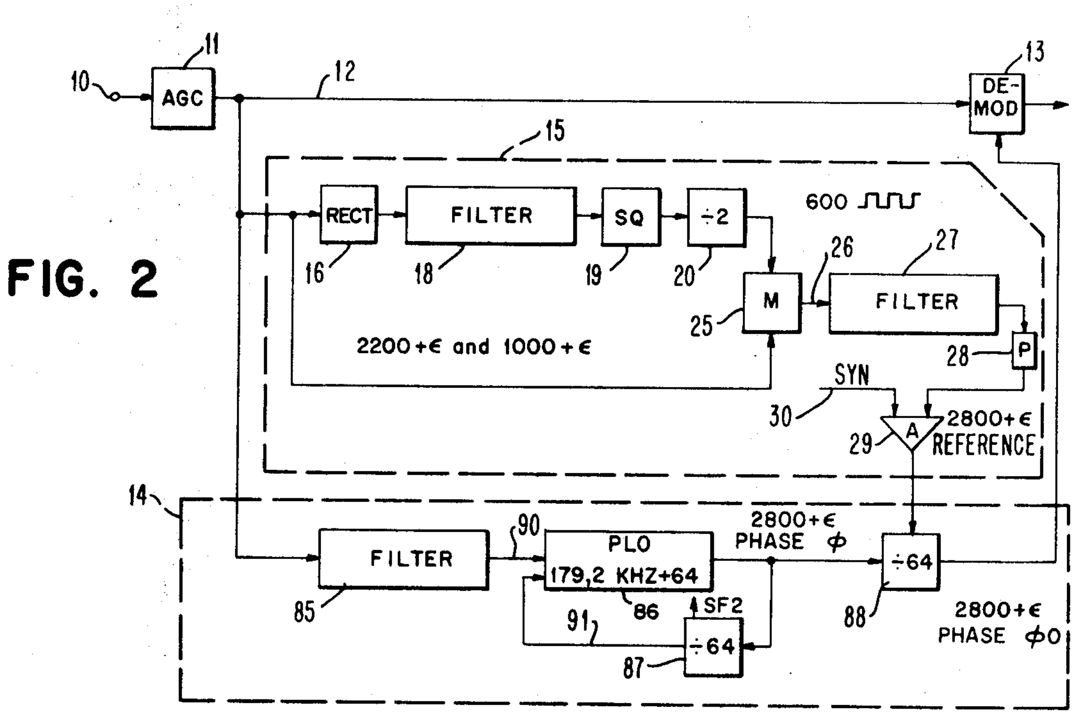
FIG. 2 is a device according to the invention.

The phase-frequency diagram shown in FIG. 1 indicates the change of phase of a signal with respect to frequency over the transmission channel, the carrier frequency also being indicated. More particularly, there is shown a phase shift $\Phi o$ that the carrier frequency would have if the channel were linear over the full frequency bandwidth. Use of such a phase shifted carrier enables the correct information signal to be restored upon demodulation. A frequency shift $\epsilon$ frequently appears too, but generally, it is the same for all the frequencies and disappears upon demodulation since the demodulation is carried out with the received carrier, i.e. the one which includes the frequency shift. Therefore, for proper demodulation, it is sufficient if the received carrier frequency $Fo+\epsilon$ is adjusted to phase $\Phi o$.

The embodiments of the invention, during an initial period, i.e. as soon as the signal is received and before it is demodulated, generate the desired carrier frequency $Fo+\epsilon$ with the correct phase $\Phi o$ from two pilot frequencies in the signal and adjust the receiver carrier signal to the phase of this restored carrier. The device which receives the transmitted carrier frequency and supplies it after its readjustment to the correct phase, goes on operating at the same phase once the readjustment period is over. The above-mentioned pilot frequencies are two frequencies received in the form $(F-f2)+\epsilon$ and $(F-f1)+\epsilon$ and correspond to frequencies $f1$ and $f2$ which are sent to the transmitter with a predetermined phase relationship. The two frequencies $f1$ and $f2$ are preferably chosen in the vicinity of the lower and higher limits of the useful frequency bandwidth of the transmission channel and so that $f2=nf1$. The two frequencies $f1$ and $f2$ are chosen so that a simple or multiple combination of the two received frequencies $(F-f1)+\epsilon$ and $(F-f2)+\epsilon$ with their respective phase shifts $\Phi 1$ and $\Phi 2$ provides carrier frequency $Fo+\epsilon$ with the desired phase $\Phi o$.

The process is described for the lower modulated sideband but is independent of the chosen modulation band; when considering the upper band, the received signals would be obtained $Fo+\epsilon$, $(F+f1)+\epsilon$, $(F+f2)+\epsilon$, and, likewise, the sign of $\epsilon$ can be either positive or negative.

The two pilot frequencies can be generated at the transmission side in a number of ways, e.g. they can be generated either in the form of discrete pilot frequencies or in the form of a more complex signal having said frequencies among its components, on condition, of course, that the other components do not cause undesired interferences.

Considered first the case of a transmission with a carrier frequency at 2800 Hz. and wherein $f1=600$ Hz. and $f2=3f1=1800$ Hz. Therefore, the components of the received signal include:

$A\cos(2\pi F1t+\Phi 1)$; $B\cos(2\pi F2t+\Phi 2)$;

$L\cos(2\pi FtB)$;

$F1=(F-f1)+\epsilon=2200+\epsilon$ Hz.;

$F2=(F-f2)+\epsilon=1000+\epsilon$ Hz.;

$F=Fo+\epsilon=2800+\epsilon$ Hz.

After demodulation, there is obtained;

$A\cos(w1t+\Phi-\Phi)$ $B\cos(-w2t+2-\Phi)$;

In order to have no distortion after demodulation, there must be obtained:

$\Phi 2-\Phi=3(\Phi 1-\Phi)$ whereby, value $\Phi$ is $$\phi=\phi_0=\frac{3\phi 1-\phi 2}{2}$$

During the synchronizing period, a transmitted signal is received at an input terminal 10 and passes through an automatic gain control (AGC) 11 to a line 12 and includes the frequency components $F1=F-f1+\epsilon$, $F2=F-f2+\epsilon$ and $F=Fo+\epsilon$ with their phase shifts $\Phi 1$, $\Phi 2$, and $\Phi$, respectively. This signal reaches demodulator 13, device 14 for recovering the carrier frequency and device 15 for the phase readjustment. The first two devices operate during both the synchronizing period and the normal operation period. The received signal in device 15 reaches circuit 16 wherein a beat frequency is obtained from the two frequencies F1 and F2 of values $2200\epsilon$ Hz. and $1000+\epsilon$ Hz., respectively. Most simply, this beat frequency is found upon rectification of the received signal on line 12 and a frequency of 1200 Hz. is obtained with phase $\Phi 1-\Phi 2$. This frequency is to be selected very accurately by the "filter" circuit 18 for the received signal includes components other than F1, F2, components which, upon rectification, will give various combinations. Since the narrowness of the filtering operation must not introduce any phase distortion, this filtering operation can be made by conventional means such as a switched filter followed by a low pass filter network. The 1200 Hz. sinusoidal component (phase $\Phi 2-\Phi 1$) of the beat frequency is then changed to 1200 Hz. square waves in squarer 19. The following divide by 2 circuit 20 changes this into 600 Hz. square waves, the frequency components of which are more particularly 600 Hz. (phase $\Phi 2-\Phi 1$)/2, 1800 Hz. (phase $3\Phi 2-\Phi 1$)/2 and some other higher harmonic frequencies. The 600 Hz. square waves are applied to a modulator 25 which also receives the received signal on line 12, the most important frequency components of which are F2, F1 and F. Modulator 25 generates a complex signal on line 26, the most important frequency components of which are $2800+\epsilon$ Hz. from the combination of the 600 Hz. with the $2200+\epsilon$Hz. and from the combination of the 1800 Hz. combined with the $1000+\epsilon$ Hz.

Each of those two combinations gives a frequency of 2800 Hz.$+\epsilon$ with phase $3\Phi 1-\Phi 2/2$ i.e. the carrier frequency $Fo+\epsilon$ with the phase $\Phi o$, it must have in order to obtain no distortion upon demodulation. The signal on line 26 is filtered in filter 27 which may be similar to filter 18 to restrict the signal to the $2800+\epsilon$Hz. frequency and is then processed in pulser 28. AND circuit 29 receives the output of pulser 28 and a SYN signal on line 30 to pass the $2800+\epsilon$ Hz. pulses only during the synchronizing period when the SYN signal is at an effective level. The carrier produced by circuit 14 from carrier $Fo+\epsilon$ on line 12 as received with phase $\Phi$ is compared with these carrier sync pulses from AND 29, and said circuits 14 are set so that even though they receive carrier Fo+ε with phase Φ, they produce it with phase Φo. When the synchronizing period is over, the output of circuit 15 is isolated by AND circuit 29 and the carrier recovery circuits 14 which receive the transmitted carrier with phase Φ go on producing it with phase Φo as will be set out later.

Figure 3:
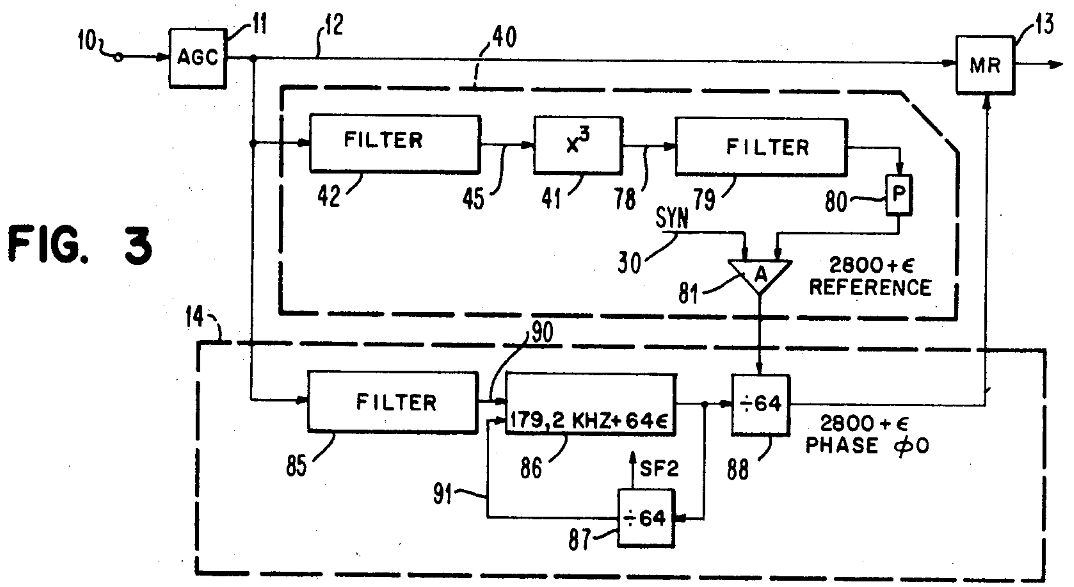
FIG. 3 is another embodiment of the invention.

In the second embodiment as diagrammed in FIG. 3, there are considered two pilot frequencies $f1$ and $f2$ which are selected so that $f2=2f1$, and which, in the chosen example, are 800 Hz. and 1600 Hz., respectively. At the receiver these frequencies are received as F1 and F2 of values 2000+ε Hz. and 1200+ε Hz. respectively; F is still selected as 2800+ε Hz. In this case, the elimination of distortion in the demodulated frequency band requires that Φ2−Φ=2 (Φ1−) which is verified if Φ=Φo=2Φ$A$Y1−Φ2.

As in the previous embodiment, carrier frequency F+ε can be obtained with the phase Φo from the two frequencies F1 and F2.

The received signal on terminal 10 is limited in AGC 11 and appears on line 12 from which it is, as in the first embodiment, applied to a readjustment device 40 where it is introduced into a frequency rejection notch filter 42 which cancels the 2800 Hz. carrier frequency, and transmits the remainder to a frequency combining circuit 41 which produces a signal, one of the components of which is frequency 2F1−F2 with phase 2Φ1$B$2, i.e. frequency 4000+2ε Hz.−(1200$g$)=2800+ε Hz. with phase 2Φ1−Φ2, a frequency which is in fact frequency Fo+ε with phase Φo. This frequency is selected by a filter circuit which is identical with those used in the first embodiment.

Figure 4:
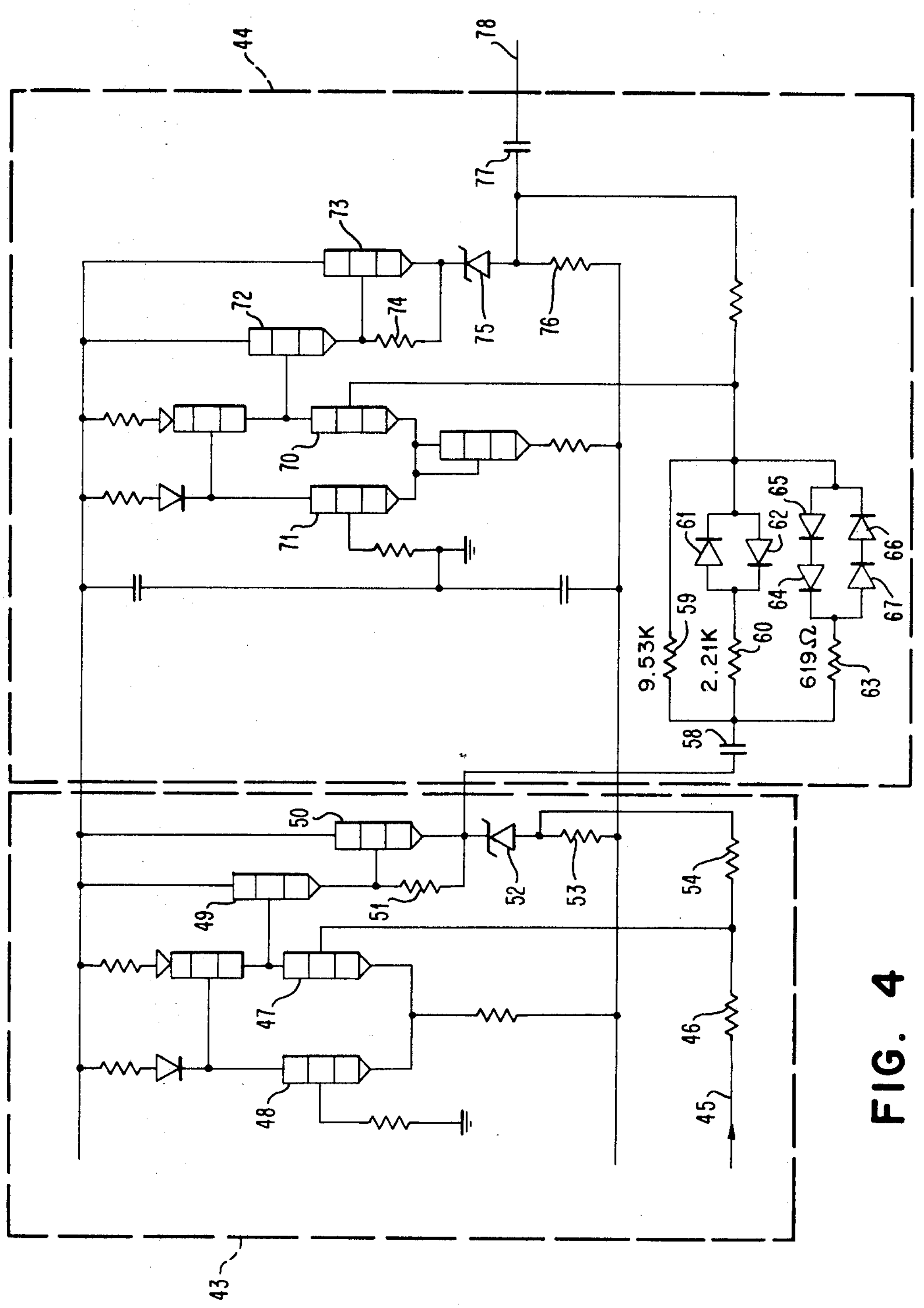
FIG. 4 is the schematic diagram of the frequency combining circuit.

The frequency combining circuit 41 is, in this particular example, a conventional circuit which provides an amplitude function such as $x^3$. More particularly, this circuit 41 can be realized by an operational amplifier associated with a threshold diode network. FIG. 4 is the schematic diagram of such a circuit. The function of the first operational amplifier 43, is for impedance adaption, with the assembly 44 providing the required cubic function. This realization is based on elements of well-known type which might have other forms. In FIG. 4, the input signal on line 45 from filter 42 is applied through a resistor 46 to the current switch formed of transistors 47 and 48. The complementary signal at the collector of transistor 47 is passed to an emitter follower pair of transistors 49 and 50, the emitter of transistor 49 being connected to the base of transistor 50 and through a resistor 51 to the emitter of transistor 50. A Zener diode 52 and a resistor 53 are in the emitter circuit of transistor 50 with the input line 45 connected for feedback through a resistor 54 to their junction.

The output voltage at the emitter of transistor 50 passes through a condenser 58 and then through a nonlinear network of a 9.53K ohm resistor 59 paralleled by a 2.21K ohm resistor 10 in series with a pair of parallel oppositely polled diodes 61 and 62 and also paralleled by a 619 ohm resistor 63 in series with four diodes 64, 65, 66, and 67 in an oppositely polled series-parallel connection. The output signal of this network is connected to another amplifier similar to 43 and comprising transistors 70, 71, 72, and 73, resistors 74 and 76 and diode 75. The output signal passes through capacitor 77 to a line 78 which is the input of a filter 79, see FIG. 3.

Filter 79 may be similar to filter 27 of FIG. 1 and passes only the 2800+ε Hz. signal which is shaped into a sequence of pulses in pulser 80. The output of pulser 80 is passed through AND 81 by the SYN signal on line 30 as in FIG. 1 to set the phase of the carrier signal.

As in the first embodiment, the carrier frequency thus generated with phase Φo is compared with the received carrier generated by the carrier frequency recovery circuits 14 which circuits are then acted upon to adjust the received carrier phase to the reference one. Once this readjustment is made, the phase readjustment device 14 is isolated upon blocking of AND circuit 81 and, in normal operation, device 14 continues producing the carrier frequency with the correct phase under frequency control of the received carrier signal.

Carrier recovery device 14 is no part of the invention and the following example is given only for a complete description of the embodiments of the invention. In both embodiments shown in the drawings carrier frequency recovery device 14 includes a narrow band filter 85 which passes the received frequency F=Fo+ε (in the chosen example: 2800+ε Hz.) to a conventional phase-locked oscillator 86 which oscillates at a frequency equal to $k$ times (here 64 times) frequency Fo+ε and which is associated with frequency dividers 87 and 88 reproducing Fo+ε.

The action of the phase readjustment device upon the carrier restoring device 14 may be realized in various ways. In the two chosen embodiments, it has been realized in the same manner.

Figure 5:
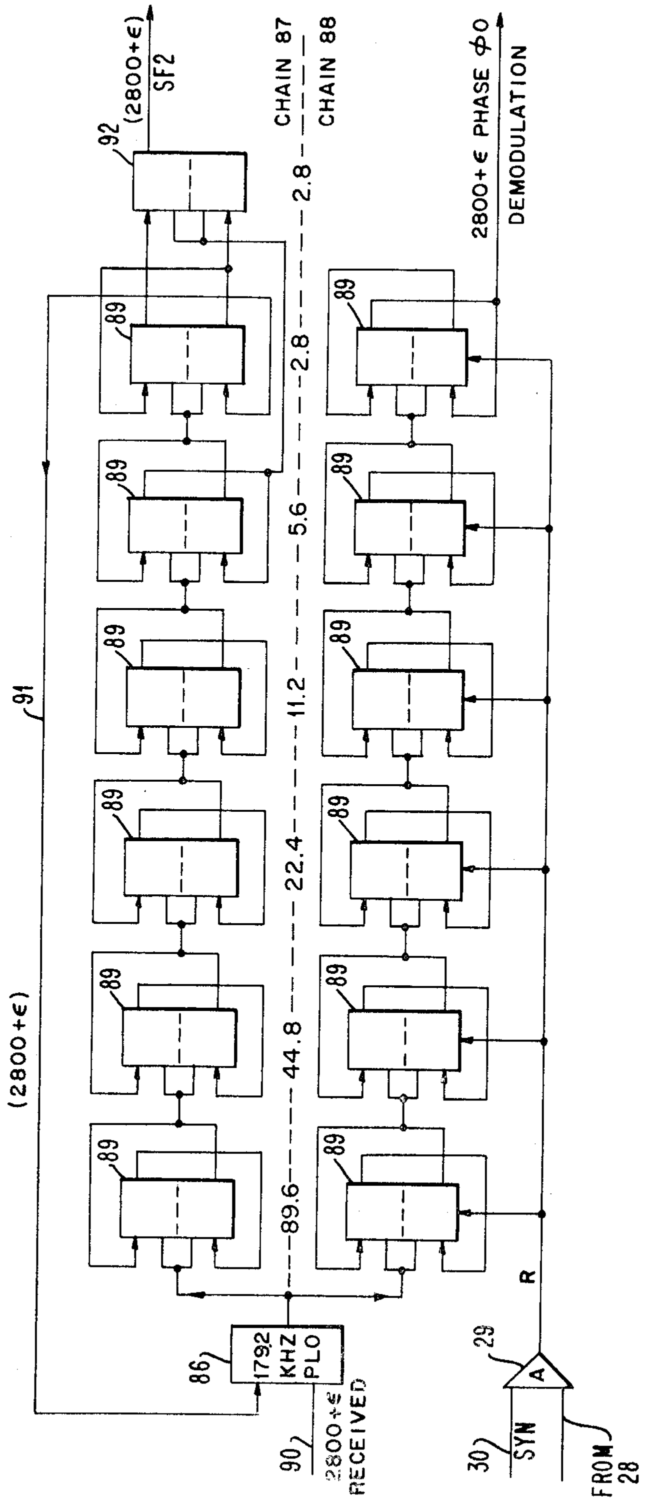
FIG. 5 shows the two dividing chains associated with the carrier oscillator.
Figure 6:
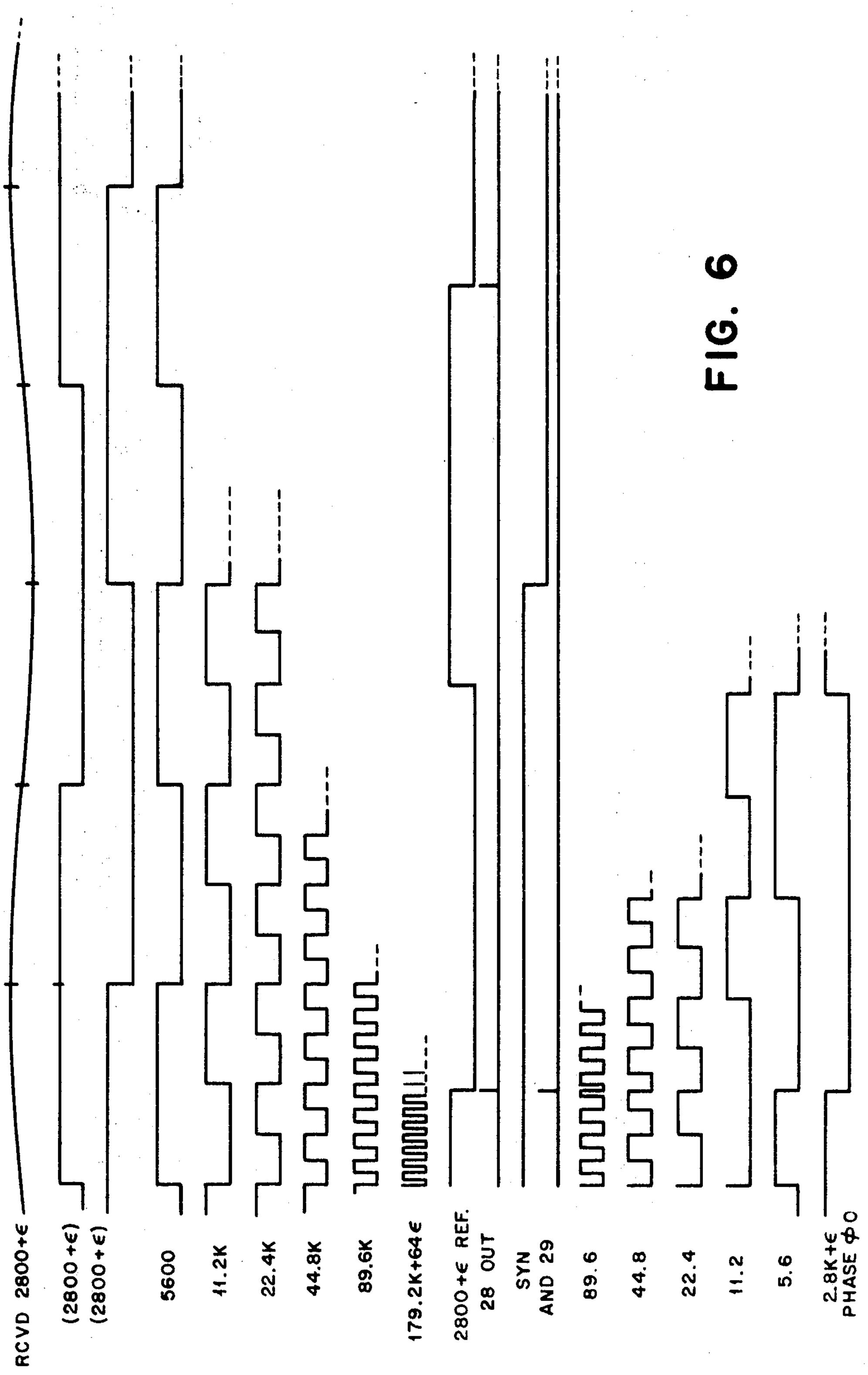
FIG. 6 is the time diagram of these operations.

FIG. 5 shows the two dividing chains associated with oscillator 86, chain 87 being the oscillator reinjection chain and chain 88, the chain which produces the carrier frequency with the correct phase. Each chain 87, 88 is comprised of a series of six bistable circuits 89 with the first receiving the output pulses of oscillator 86, the chain resulting in a division of the oscillator frequency by a factor of 64. The last circuit of chain 87 is connected back on a line 91 to oscillator 86 to hold the oscillator synchronized with the input signal on line 90 from filter 85. An auxiliary bistable circuit 92 is controlled from the last two stages of chain 87 to provide a received carrier signal for any auxiliary purposes. The 2800+ε reference frequency obtained at filter 27 (or 79) appears as sharp pulses at the output of pulser 28 (or 80) the circuits of which produce a pulse upon each transition to the "low level" of said reference frequency. When the receiver is in the synchronizing period, SYN line 30 is "high" and AND circuit 29 (or 81) gates the pulses from pulser 28 (or 80) to dividing chain 88. These pulses cause each of the dividers 89 of chain 88 to assume a "low level" condition. The dividers 89, thereafter, operate in normal condition from the pulses produced by oscillator 86 which has already been frequency adjusted on the received carrier. The pulse from AND 29, when it set each of the dividers to a "low level" condition, has adjusted the chain 88 onto the phase of the regenerated reference frequency 2800+ε Hz., and thereafter, device 14 gives out the 2800+ε Hz. frequency with the correct phase. FIG. 6 shows the time diagram of these operations.

While the invention has been particularly shown and described with reference to preferred embodiments thereof, it will be understood by those skilled in the art that various changes in form and details may be made therein without departing from the spirit and scope of the invention.

We claim:

1. In a communications system of the type transmitting a representation of a carrier signal and one sideband of the product of said carrier signal and an information signal including a synchronizing signal having at least a pair of integral harmonically related signals having a fixed phase relationship, a receiver including in combination, means responsive to the reception of said transmitted signal to generate a carrier signal having a frequency and phase corresponding to the received carrier signal, filter means responsive to said received information signal to regenerate a signal at the received carrier frequency and of the phase required for demodulation of the information signal, a pulse generator driven by said filter means to provide a pulse each time the regenerated carrier signal has a predetermined phase angle, a gate responsive to said pulses from said pulse generator and to a synchronizing signal to pass said pulses during a synchronizing period, a second carrier signal generator connected to said gate and responsive to said pulses from said gate to generate another carrier signal having a phase corresponding to that of said regenerated signal and, a demodulator connected to receive said transmitted signal and said second carrier signal and operating to provide a received information signal.

2. A communications system receiver as in claim 1 in which said filter means comprises;

a beat frequency device responsive to said received signal to generate a signal corresponding to the difference of said pair of signals, a filter on the output of said beat frequency device to block transfer of all but said difference frequency of said pair of signals, a wave shaper and frequency divider driven by said filter to generate a square wave at a subharmonic of said difference frequency and, a modulator connected to receiving said square wave and said received signal and operative to provide a regenerated carrier signal.

3. A communication system receiver as in claim 1 which said filter means comprises:

a filter to extract said pair of signals from said received signal, a nonlinear circuit on the output of said filter to provide a cubic multiplication of said pair of signals, and another filter receiving the output of said nonlinear circuit and passing only the frequency corresponding to said regenerated carrier signal.

4. In a communications system of the type transmitting a carrier signal and the lower sideband resulting from modulation of said carrier signal by an information signal, said information signal during an initial synchronizing period including at least a pair of signals having an integral harmonic relationship, a receiver including in combination;

a demodulator receiving said transmitted information signal and a phase adjusted carrier signal to regenerate said information signal, a device responsive to said transmitted carrier signal to generate a carrier signal having a frequency and phase corresponding to said carrier signal as received, means responsive to the received modulated representations of said pair of signals to generate signals indicating the carrier signal phase needed for demodulation of said received information signal, means connected to said responsive means to pass said phase indicating signals during an initial synchronizing period and, a second carrier signal generator connected to said carrier signal generating device to introduce a phase shift between said generated carrier signal and said second carrier signal, said second carrier signal generator connected to receive said passed phase indicating signals and responsive thereto to provide phase adjusted carrier signals over a connection to said demodulator.

5. A communications system receiver as in claim 4 in which said responsive means comprises;

a beat frequency device responsive to said received signal to generate a signal corresponding to the difference of said pair of signals, a filter on the output of said beat frequency device to block transfer of all but said difference frequency of said pair of signals, a wave shaper and a frequency divider connected to said filter to generate a square wave at a subharmonic of said difference frequency and, a modulator connected to receive said square wave and said received signal to provide a regenerated carrier signal.

6. A communications system receiver as in claim 4 in which said responsive means comprises;

a filter to extract said pair of signals from said received signal, a nonlinear circuit on the output of said filter to provide a cubic multiplication of said pair of signals, and another filter receiving the output of said nonlinear circuit and passing only the frequency corresponding to said regenerated carrier signal.